(12) United States Patent
Parellada et al.

(10) Patent No.: US 6,708,378 B2
(45) Date of Patent: Mar. 23, 2004

(54) FASTENERS AND METHODS OF MAKING FASTENERS

(75) Inventors: Luis Parellada, Palafrugell (ES); Juan Sánchez, Argentona (ES)

(73) Assignee: Velcro Industries B.V., Netherlands (AN)

(*) Notice: Subject to any disclaimer, the term of this patent is extended or adjusted under 35 U.S.C. 154(b) by 42 days.

(21) Appl. No.: 09/870,063

(22) Filed: May 30, 2001

(65) Prior Publication Data

US 2001/0022409 A1 Sep. 20, 2001

Related U.S. Application Data

(62) Division of application No. 09/231,134, filed on Jan. 15, 1999, now Pat. No. 6,248,276.

(51) Int. Cl.[7] .......................... A44B 18/00; B29C 45/32
(52) U.S. Cl. ....................... 24/452; 24/304; 24/306; 24/442; 24/446
(58) Field of Search ...................... 24/452, 306, 442, 24/446, 304

(56) References Cited

U.S. PATENT DOCUMENTS

| | | |
|---|---|---|
| 2,820,277 A | 1/1958 | Forster |
| 3,138,841 A | 6/1964 | Naimer |
| 3,191,255 A | 6/1965 | Nealis |
| 3,192,589 A | 7/1965 | Pearson |
| 3,266,113 A | 8/1966 | Flanagan, Jr. |
| 3,312,583 A | 4/1967 | Rochlis |
| 3,399,425 A | 9/1968 | Lemelson |
| 3,408,705 A | 11/1968 | Kayser et al. |
| 3,527,001 A | 9/1970 | Kleemeier et al. |
| 3,557,407 A | 1/1971 | Lemelson |
| 3,718,725 A | 2/1973 | Hamano |
| 3,808,648 A | 5/1974 | Billarant et al. |
| 4,169,303 A | 10/1979 | Lemelson |
| 4,290,174 A | 9/1981 | Kalleberg |
| 4,454,183 A | 6/1984 | Wollman |
| 4,775,310 A | 10/1988 | Fischer |
| 4,794,028 A * | 12/1988 | Fischer ..................... 24/306 |
| 4,811,468 A * | 3/1989 | Yamada ..................... 24/442 |
| 4,880,589 A * | 11/1989 | Shigemoto et al. ......... 264/216 |
| 5,076,793 A * | 12/1991 | Aghevli et al. ............. 434/196 |
| 5,077,870 A | 1/1992 | Melbye et al. |
| 5,505,747 A | 4/1996 | Chesley et al. |
| 5,607,635 A | 3/1997 | Melbye et al. |
| 5,657,516 A | 8/1997 | Berg et al. |
| 5,679,302 A | 10/1997 | Miller et al. |
| 5,713,111 A * | 2/1998 | Hattori et al. ................ 24/452 |

(List continued on next page.)

FOREIGN PATENT DOCUMENTS

| | | |
|---|---|---|
| DE | 2 213 686 | 10/1972 |
| DE | 296 08 260 | 5/1996 |
| EP | 0 806 158 A2 | 11/1997 |

(List continued on next page.)

OTHER PUBLICATIONS

Velcro Fastener Application Publications, Velcro International Ltd., 7 pp (published prior to Jan. 15, 1998).

*Primary Examiner*—Victor Sakran
(74) *Attorney, Agent, or Firm*—Fish & Richardson P.C.

(57) ABSTRACT

A method of forming a fastener is provided, including (a) forming, from a thermoformable material, a preform product having a sheet-form base and an array of preform stems integrally molded with and extending from the base to corresponding terminal ends; (b) heating the terminal ends of the stems to a predetermined softening temperature, while maintaining the sheet-form base and a lower portion of each stem at a temperature lower than the softening temperature; and (c) contacting the terminal ends with a contact surface that is at a predetermined forming temperature, lower than the softening temperature, to deform the terminal ends to form heads therefrom that overhang the sheet-form base. Fasteners and other methods of forming them are also provided.

12 Claims, 8 Drawing Sheets

U.S. PATENT DOCUMENTS

| | | | |
|---|---|---|---|
| 5,755,015 A | 3/1998 | Theodos et al. | |
| 5,749,129 A | 5/1998 | Murasaki et al. | |
| 5,781,969 A | 7/1998 | Akeno et al. | |
| 5,792,408 A | 8/1998 | Akeno et al. | |
| 5,800,845 A | 9/1998 | Akeno et al. | |
| 5,845,375 A | 12/1998 | Miller et al. | |
| 5,868,987 A | 2/1999 | Kampfer et al. | |
| 5,879,604 A | 3/1999 | Melbye et al. | |
| 5,895,388 A * | 4/1999 | Zobel | 606/85 |
| 5,951,931 A | 9/1999 | Murasaki et al. | |
| 5,953,797 A | 9/1999 | Provost et al. | |
| 5,981,027 A | 11/1999 | Parellada | |
| 6,000,106 A | 12/1999 | Kampfer et al. | |
| 6,039,911 A | 3/2000 | Miller et al. | |
| 6,054,091 A | 4/2000 | Miller et al. | |
| 6,162,040 A | 12/2000 | Clune | |
| 6,234,886 B1 * | 5/2001 | Rivard et al. | 451/353 |
| 6,248,276 B1 | 6/2001 | Parellada et al. | |
| 6,287,665 B1 | 9/2001 | Hammer | |
| 6,393,673 B1 * | 5/2002 | Kourtidis et al. | 24/304 |

FOREIGN PATENT DOCUMENTS

| | | |
|---|---|---|
| EP | 0 811 332 A2 | 12/1997 |
| GB | 2 279 106 | 12/1994 |
| WO | WO82/02480 | 8/1982 |
| WO | WO 92/04839 | 4/1992 |
| WO | WO 94/23610 | 10/1994 |
| WO | WO98/14086 | 4/1998 |
| WO | WO98/30381 | 7/1998 |
| WO | WO98/57564 | 12/1998 |
| WO | WO98/57565 | 12/1998 |
| WO | WO 99/26507 | 6/1999 |
| WO | WO 00/41479 | 7/2000 |
| WO | WO 01/24654 | 4/2001 |

* cited by examiner

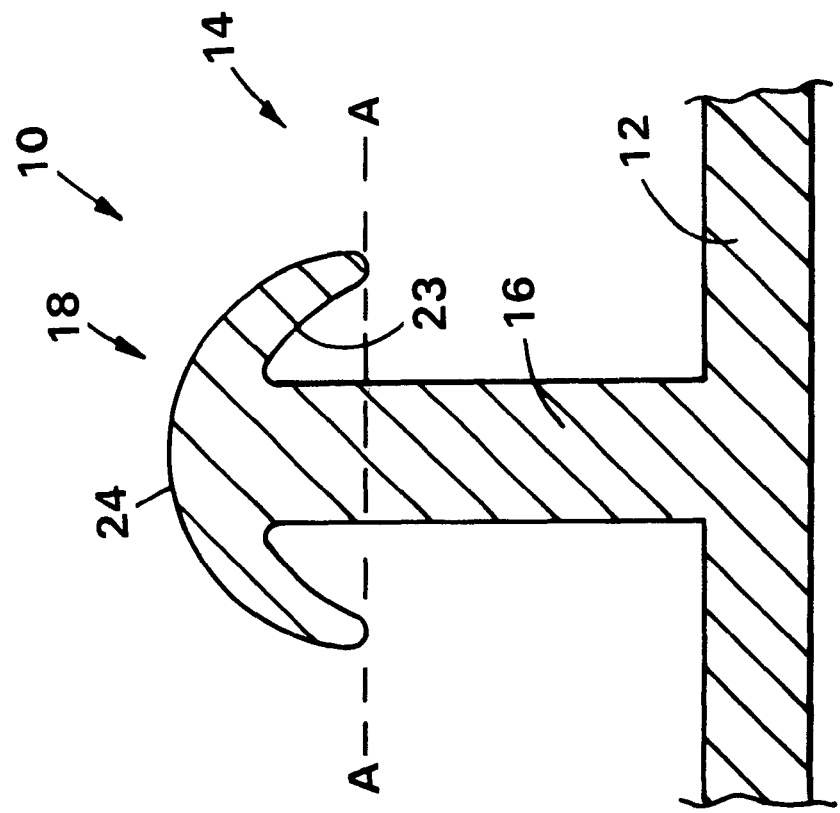
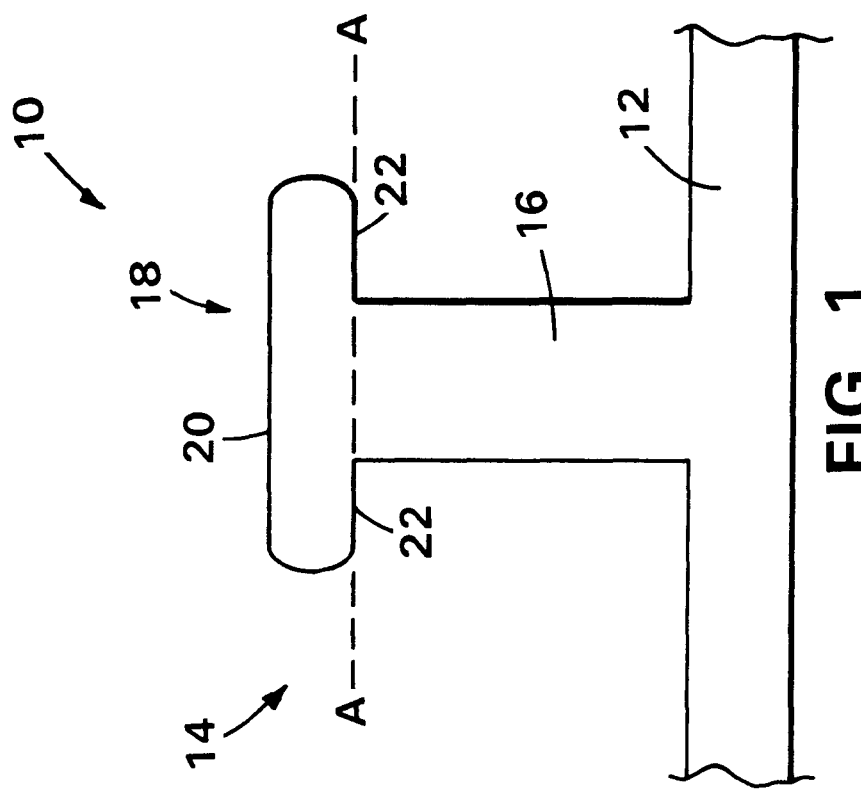

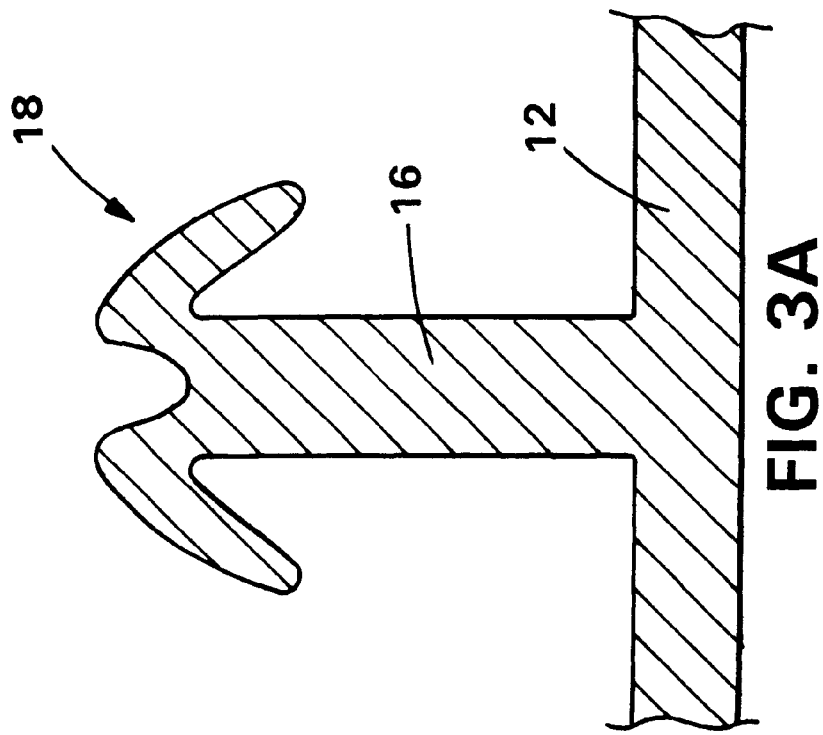
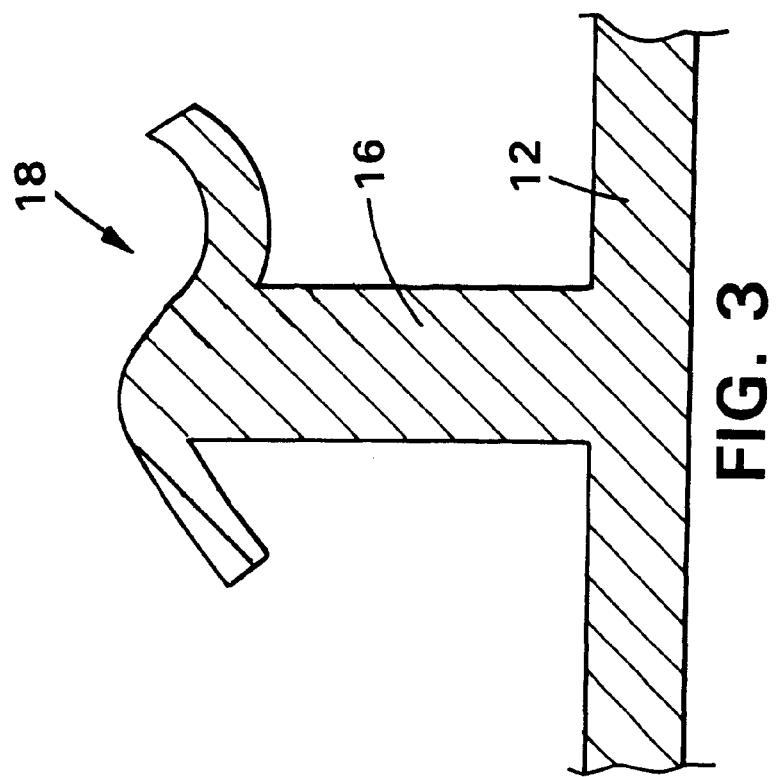

FASTENERS AND METHODS OF MAKING FASTENERS

This application is a division of application Ser. No. 09/231,134, filed Jan. 15, 1999, now U.S. Pat. No. 6,248,276.

BACKGROUND OF THE INVENTION

The present invention relates to fasteners, particularly to male fastener components for hook and loop fasteners, to methods of manufacturing them, and to their use in securing a mesh material to a window frame to provide a temporary insect screen.

It is common, particularly in the United States, to provide windows with permanent screens to allow the windows to be opened without admitting insects. However, such screens are not always provided, and in fact are relatively uncommon in homes in Europe. To meet the need for screening in these situations, temporary screens have been developed. These screens are generally installed when insects are present and removed when insects are not present, by removably attaching a sheet of mesh material to an attachment strip that is adhered to the window frame. Generally these temporary screens are mounted on the inside of the window.

Attachments strips have been formed of, among other things, the male component of a hook and loop type fastener. To secure the screen, the male fastener elements are inserted through the openings of the mesh material and engage the sides of the mesh openings. It is desirable that the engagement between the male fastener elements and the mesh openings provide good peel strength, so that the screen is not detached by wind, and that the attachment strip be inexpensive and relatively attractive.

There is also a general need for male fastener components for hook and loop fasteners that provide good multidirectional peel and shear strength properties and that are relatively inexpensive to manufacture.

SUMMARY OF THE INVENTION

In one aspect, the present invention features a method of forming a fastener. The method includes: (a) forming, from a thermoformable material, a preform product having a sheet-form base and an array of preform stems integrally molded with and extending from the base to corresponding terminal ends; (b) heating the terminal ends of the stems to a predetermined softening temperature, while maintaining the sheet-form base and a lower portion of each stem at a temperature lower than the softening temperature; and (c) contacting the terminal ends with a contact surface that is at a predetermined forming temperature, to deform the terminal ends to form heads therefrom that overhang the sheet-form base.

Preferred methods include one or more of the following features. The forming temperature is sufficiently low that the thermoformable material does not adhere to the contact surface. The forming temperature is lower than the softening temperature. The contact surface comprises the cylindrical surface of a roll. The contact surface is cooled to maintain the forming temperature during step (c). In step (c), the heads that are formed are substantially disc-shaped or mushroom-shaped. The thickness of each disc-shaped head is from about 5 to 15% of the equivalent diameter of the disc. The head has a substantially dome-shaped surface overhanging the base. Step (a) includes molding the stems in molding cavities in a mold roll. In step (b), the region extends from the terminal end towards the base a distance equal to from about 15 to 25% of the total distance from the terminal end to the base. The contact surface has a surface finish selected from the group consisting of dimpled, smooth, textured, and combinations thereof. The surface finish comprises dimples and the contact surface includes a density of dimples per unit area of the contact surface that is greater than or equal to the density of stems per unit area of the base. During step (c), the dimples are in at least partial registration with the stems.

In another aspect, the invention relates to a method of forming a fastener, including: (a) forming a plurality of stems, extending from a common base to a terminal end, from a thermoformable material; (b) heating a region of the stems adjacent the terminal ends to a predetermined softening temperature, to soften the material in the region, while maintaining the remaining portion of the stems at a temperature lower than the softening temperature; and (c) contacting the terminal ends with a contact surface to form heads at the terminal end of the stems, at least a portion of the contact surface having a sufficiently rough texture to impart a loop-engaging surface roughness to at least a portion of the heads.

Preferred methods include one or more of the following features. The contact surface comprises the cylindrical surface of a roll. The contact surface has a sandpaper-like texture. The contact surface has a surface roughness (rugosity) of about 10 to 200 microns. The contact surface defines a plurality of dimples. The contact surface includes a density of dimples per unit area of the contact surface that is greater than or equal to the density of stems per unit area of the base. The surface roughness imparted to the heads is sufficient to increase the peel strength of the fastener by from about 10 to 100%.

In yet another aspect, the invention features a fastener element including an elongated stem extending and molded integrally with a substantially planar base, and a head disposed at a terminal end of the stem, at least a portion of the head having a rough surface having a sandpaper-like surface texture.

Preferred fastener elements include one or more of the following features. The rough surface has a surface roughness (rugosity) of from about 10 to 200 microns. The rough surface has sufficient surface roughness to increase the peel strength of the fastener by from 10 to 100%. The head is substantially disc-shaped or mushroom-shaped.

The invention also features an attachment strip for attaching a mesh screen to a surface. The attachment strip includes (a) a substantially planar base; (b) a plurality of elongated stems extending from the base; and (c) a plurality of heads, each head being disposed at a terminal end of one of the stems. According to one aspect of the invention, at least a portion of the heads have a rough surface having a sandpaper-like surface texture.

The term "disc-shaped", as used herein, refers to a shape having top and bottom surfaces, at least a portion of the top surface being substantially parallel to a corresponding portion of the bottom surface, and having a thickness that is substantially less than its equivalent diameter. "Equivalent diameter" means (a) for a circular disc, the actual diameter, and (b) for a disc having a non-circular shape, the diameter of a circular disc having the same thickness and surface area as the non-circular disc. When viewed from above, the disc-shape may be substantially circular, irregular in shape but approximately circular, or non-circular, e.g., square or cross-shaped. The disc-shape may be flat, or may have other shapes such as domed, wavy, or pyramidal.

The term "mushroom-shaped", as used herein, refers to any shape having a domed portion, with the exception of a complete sphere.

The phrase "loop-engaging surface roughness", as used herein, means a degree of surface roughness that is sufficient to "catch" on a loop fastener element and provide a partial, momentary engagement therewith.

The term "sandpaper-like", as used herein, means a surface roughness akin to the surface texture of sandpaper.

The fastener elements of the invention have a head geometry that advantageously provides a strong attachment to a female fastener component. The fastener elements are particularly well adapted for use in fastener tapes for attaching an insect screen to a window frame, as the head geometry provides a strong engagement with the mesh of the insect screen. Insect screen fastener tapes of the invention exhibit good peel strength and thus good resistance to detachment due to wind. The methods of the invention allow the fastener elements to be manufactured using a relatively simple and economical process.

Other features and advantages will become apparent from the following Description of the Preferred Embodiments, the drawings and the claims.

BRIEF DESCRIPTION OF THE DRAWINGS

FIG. 1 is a side view of a fastener including a fastener element according to one embodiment of the invention.

FIG. 2 is a side cross-sectional view of a fastener element according to an alternate embodiment of the invention.

FIGS. 3 and 3A are side cross-sectional views of fastener elements according to other alternate embodiments of the invention.

DESCRIPTION OF THE PREFERRED EMBODIMENTS

Figure 2A:
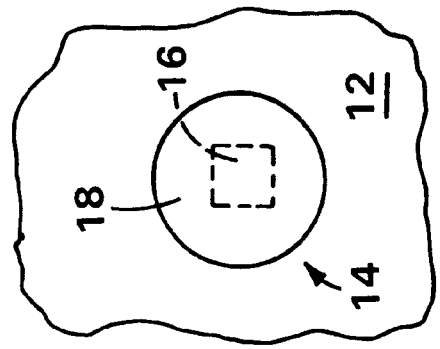
FIGS. 2A and 2B are top views of fastener elements according to alternate embodiments of the invention; these fastener elements have the same cross-sectional shape as that shown in FIG. 2.

Referring to FIG. 1, fastener 10 includes a base 12 and a fastener element 14 extending from the base. (Fastener 10 generally includes an array of fastener elements; a single fastener element is shown for clarity.) Fastener element 14 includes a stem 16 and, at the terminal end of stem 16, a head 18. Head 18 is shaped for engagement with another fastener component, for example a female fastener component having a plurality of loops, a mesh such as an insect screen, or another fastener component similar to fastener 10.

Figure 4:
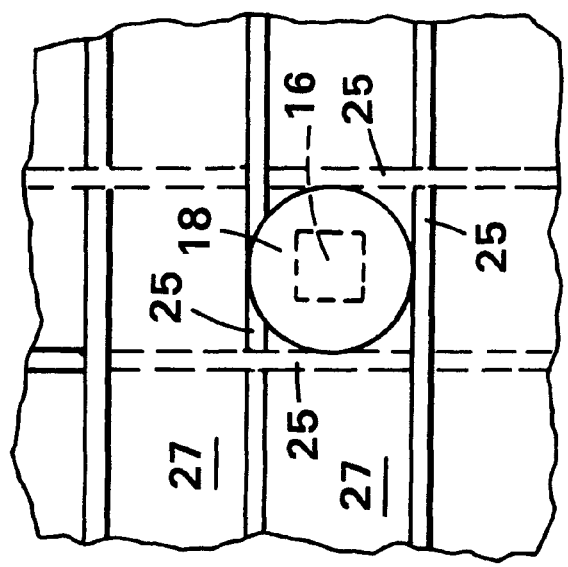
FIG. 4 is a front view showing a fastener element of FIG. 1 or FIG. 2 engaged with the mesh opening of an insect screen.

As shown in FIG. 1, head 18 is substantially disc shaped, including a substantially planar top surface 20, and a substantially planar bottom surface 22 that faces and overhangs base 12. It is desirable that the disc be relatively thin, allowing a cooperating fastener element, e.g., a loop or the wire mesh of a window screen, to penetrate into the disc by flexing the disc material. Preferably, the thickness of the disc is from about 5 to 15% of the equivalent diameter of the disc. If the disc is thinner, it will tend to have reduced cycle life (i.e., durability during repeated engagement and disengagement of the fastener), whereas if the disc is thicker the fastener may exhibit reduced peel strength. As shown in FIG. 1A, head 18 is substantially circular when viewed from above, and stem 16 is substantially square in radial cross-section. (In other embodiments, head 18 can be irregular in shape (FIG. 1B), square (FIG. 1C) or cross-shaped (FIG. 1D) when viewed from above.) The disc shape is particularly advantageous for engagement with a mesh screen 23 (FIG. 4) because the sides 25 of the mesh opening can penetrate into the thin disc. As a result, as shown in FIG. 4, secure engagement can be provided even though the disc is smaller than the mesh opening and only engages one or two sides 25 of the mesh opening. The head 18 is also suitable for engagement with loops or with other similarly shaped heads.

Figure 2B:
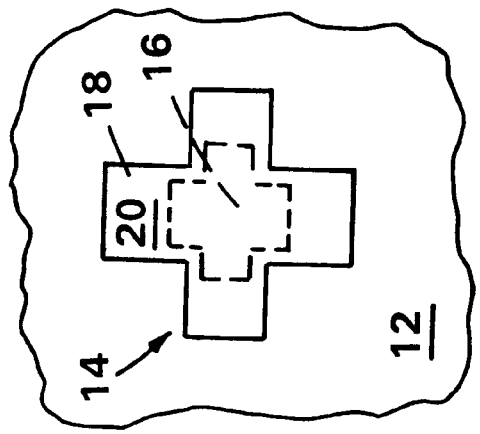
Figure 1C:
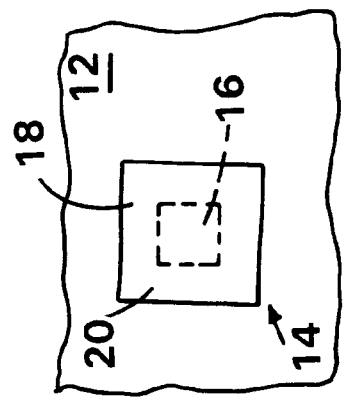
FIGS. 1B, 1C and 1D are top views of fastener elements according to alternate embodiments of the invention; these fastener elements have the same profile, when seen from the side, as that shown in FIG. 1.
Figure 1D:
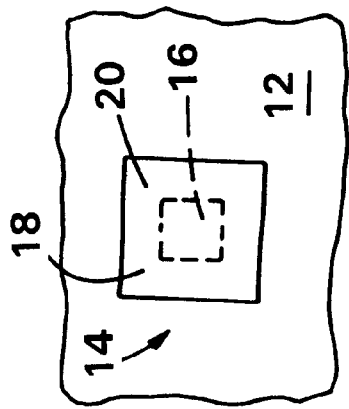
Figure 1A:
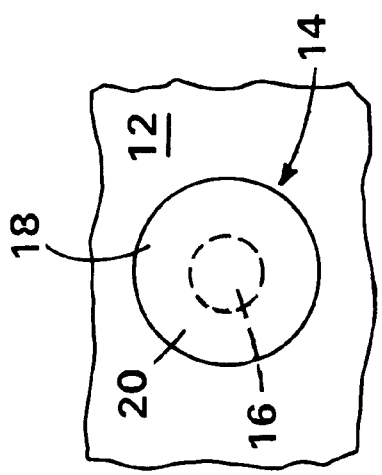
FIG. 1A is a top view of the fastener element, with the stem portion shown in phantom lines.
Figure 1B:
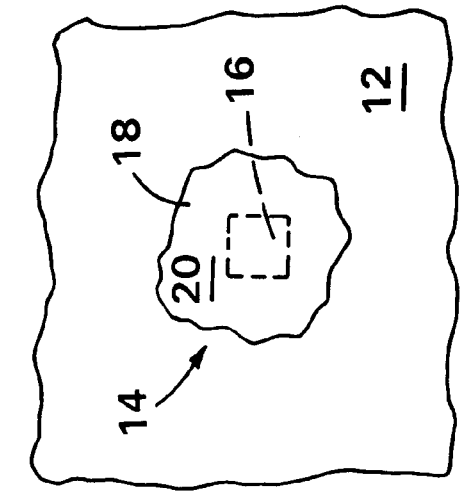

In an alternate embodiment, shown in FIG. 2, head 18 includes a domed portion 24, and a correspondingly dome-shaped lower surface 23, a major portion of which is substantially parallel to domed portion 24. Surface 23 faces and overhangs base 12, providing a surface for engagement with a female fastener element or mesh. Head 18 can have various shapes. For example, head 18 can be a disc that is square or rectangular when viewed from the top (FIG. 2A), with two opposed edges of the disc being bent down to form a U-shaped domed portion. Alternatively, head 18 can be a circular disc that is bent down around its periphery to form a mushroom-like domed portion. These head shapes are particularly advantageous for engagement with a mesh screen (FIG. 4) because the domed portion allows smooth penetration into the mesh openings 27 and the thin disc shape allows sides 25 of the mesh opening to be embedded into surface 23. Head 18 can also be used to engage the loops of a female fastener component, or to self-engage with another fastener having similarly shaped heads.

Figure 3C:
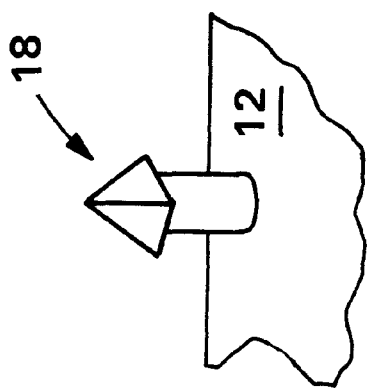
FIGS. 3B and 3C are perspective views of fastener elements according to other alternate embodiments of the invention.
Figure 3B:
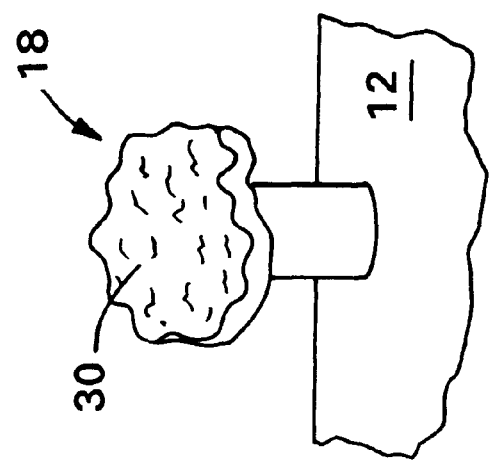

In alternate embodiments, shown in FIGS. 3 and 3A, the disc-shaped heads are "wavy". The head 18 may be S-shaped in cross-section, as shown in FIG. 3, or may be W-shaped, as shown in FIG. 3A. The head shapes shown in these figures may be provided with a rough surface, as described below with reference to FIG. 3B.

In another alternate embodiment, shown in FIG. 3B, head 18 includes a rough, sandpaper-like surface 30. Preferably, the texture of surface 30 resembles that of 320 grain sandpaper (used for sanding metals). The sandpaper-like surface includes protrusions that tend to catch on the fastener component with which the head 18 is engaged (not shown), making it more difficult to inadvertently disengage the mated fastener components. As a result, the strength of engagement is generally increased, relative to the strength obtained from a similar fastener element having a smooth surface. In particular, in preferred embodiments the peel strength, as measured by ASTM D 5170-91 ("T" method), is increased by about 10 to 100%. It is preferred that the surface 30 have a surface roughness (rugosity) of at least 10 microns, more preferably from about 10 to 200 microns.

In another embodiment, shown in FIG. 3C, the head 18 is pyramidal in shape. Preferably, the surface of the head that overhangs the base has the same contour as the upper surface of the head, so that a major portion of the surfaces is substantially parallel.

Figure 5:
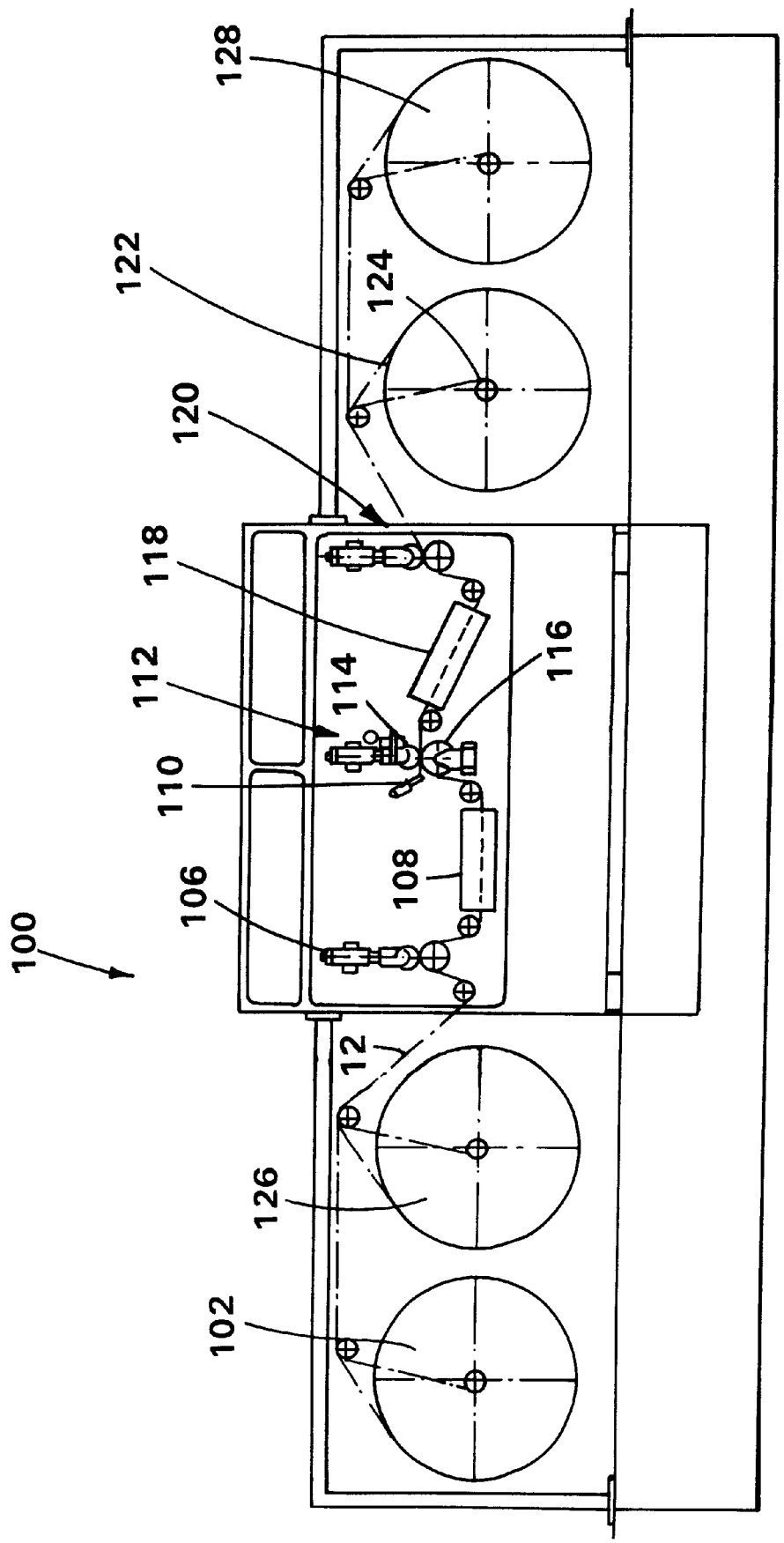
FIG. 5 is a schematic side view of a machine for manufacturing a fastener element.

In all of the embodiments shown in FIGS. 1–3C, the head overhangs the base to a significant extent. Preferably, the surface area A1 of the surface overhanging the base is equal to at least 20% greater than the surface area A2 of the radial cross-section of the stem 16 taken along line A—A, i.e., where the stem intersects the head. The surface area A1 may be up to 600% greater than the surface area A2. For example, for a fastener element in which surface area A2 is 0.03 mm$^2$, surface area A1 is preferably about 0.05 mm$^2$. It is also generally preferred that the amount of overhang be substantially uniform around the perimeter of the stem, to provide a multi-directional engagement. However, for ease of manufacture it will in some cases be preferred that the amount of overhang be non-uniform, as will be discussed below with reference to FIG. 5.

Figure 7B:
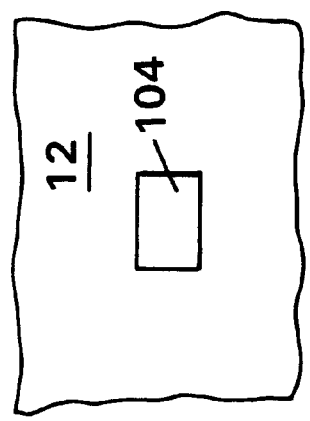
FIG. 7B is a top view of the portion of the base shown in FIG. 7A.

A machine 100 for forming the fastener elements described above is shown in FIG. 5. A supply roll 102 introduces a continuous supply of a stem-carrying base 12 (shown in FIGS. 7–7B) into the machine 100. Stem-carrying base 12 is formed of a thermoformable polymer. In a previous manufacturing step, roll 102 was wound up as the take-up roll at a molding station (not shown) at which stems 104 (FIGS. 7–7B) were integrally molded onto base 12. The molding station may include a mold roll having a plurality of mold cavities provided by aligned plates, e.g., as described, for example, by U.S. Pat. No. 4,794,028, the disclosure of which is incorporated herein by reference, or may utilize any desired stem-molding technique. As shown in FIG. 7B, the stems may be square in radial cross-section, if a square head is desired, or may be oval, round, cross-shaped, or any other desired shape, for forming similarly shaped heads (see FIGS. 1A–1D).

The supply roll 102 is unwound by drive mechanism 106, which conveys stem-carrying base 12 into optional pre-heating area 108 which raises the temperature of the stem-carrying base 12 to a pre-heat temperature that is above room temperature but much lower than the Vicat temperature of the polymer. This pre-heating allows the tips of the stems to be heated to a predetermined softening temperature more quickly during the next step of the process.

Figure 7A:
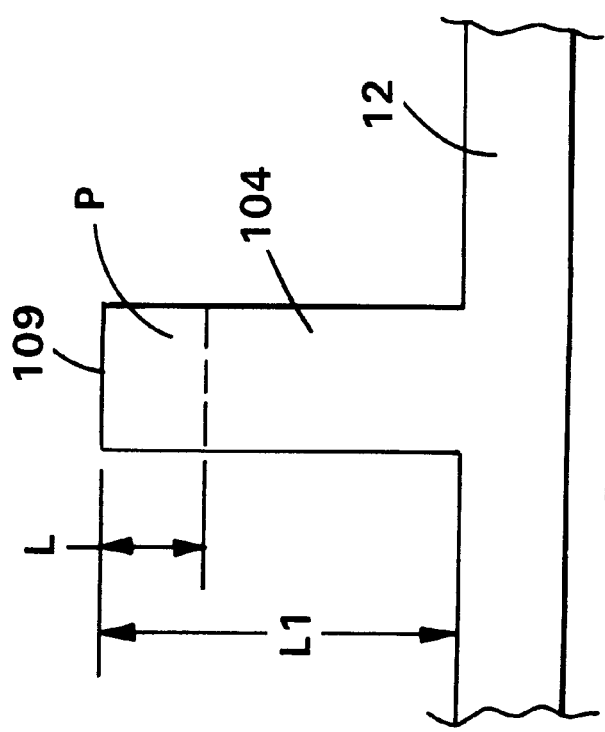
FIG. 7A is a highly enlarged view of one of the stems shown in FIG. 7.
Figure 7:
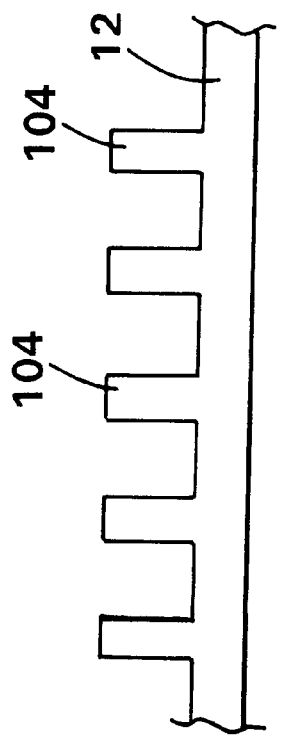
FIG. 7 is an enlarged side detail view of area A in FIG. 6, showing a portion of the stem-carrying base prior to conformation.

Next, the base 12 moves to heating device 110, which heats a portion of the stems. As indicated in FIG. 7A, only a portion P of the stems 104, adjacent their tips 109, is heated by heating device 110, leaving the remainder of the stem relatively cool and thus relatively rigid. Preferably, the length L of portion P is less than 30% of the total length L1 of the stem, more preferably from about 15% to 25% of L1. Portion P is heated to a softening temperature at which portion P can be formed into a desired head shape, typically a temperature that is greater than or equal to the Vicat temperature of the thermoformable polymer. The remainder of the stem is not heated, and remains at a temperature that is less than the softening temperature S, preferably at least 10% less.

Figure 6:
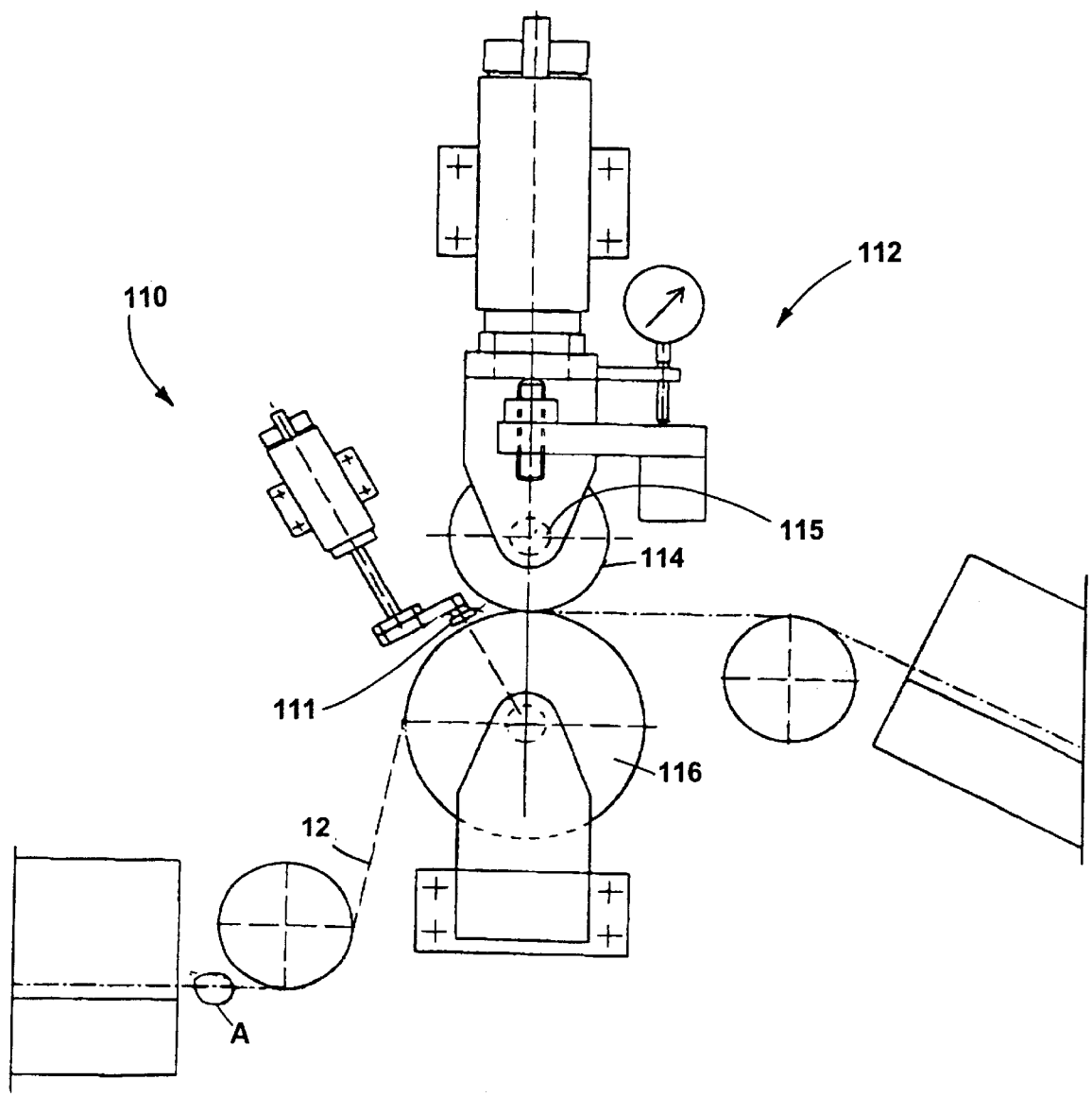
FIG. 6 is an enlarged view of a portion of the machine shown in FIG. 5.

To ensure that only portion P is heated to the softening temperature, it is preferred that heating device 110 include a non-contact heat source 111 (FIG. 6) that is capable of quickly elevating the temperature of material that is very close to the heat source, without raising the temperature of material that is relatively further away from the heat source. Suitable non-contact heat sources include flame heaters, electrically heated nichrome wire, and radiant heater blocks. To heat portion P to the softening temperature without contact, the heat source typically must be at a relatively high temperature. For example, if the softening temperature is from about 100 to 140° C., the temperature of the heat source will generally be from about 300 to 1000° C. and the heat source will be positioned from about 0.1 to 30 mm from the tips of the stems.

After portion P of the stems has been heated, the base 12 moves to conformation head 112, at which base 12 passes between conformation roll 114 and drive roll 116. Conformation roll 114 forms the portion P of the stems into a desired head shape, as will be described in further detail below, while drive roll 116 advances base 12 and flattens it against roll 114 to enhance head uniformity. It is preferred that the temperature of conformation roll 114 (the forming temperature) be lower than the softening temperature. Maintaining the conformation roll 114 at this relatively low temperature has been found to allow the conformation roll to flatten the spherical ("ball-shaped") heads that are generally formed during the previous heating step into a desired head shape. Spherical heads are generally undesirable, as such heads tend not to provide secure engagement with a mating fastener. A low forming temperature also prevents adhesion of the thermoformable polymer to the conformation roll. Generally, to obtain the desired forming temperature it is necessary to chill the conformation roll, e.g., by running cold water through a channel 115 in the center of the roll, to counteract heating of the conformation roll by the heat from portion P of the stems. If further cooling is needed to obtain the desired forming temperature, the drive roll may be chilled in a similar manner.

Figure 8:
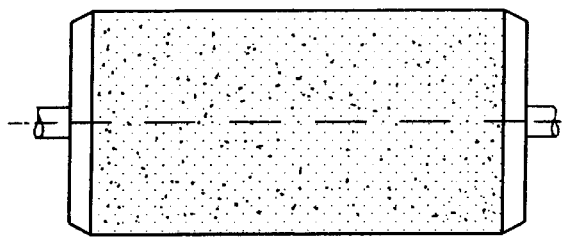
FIGS. 8–8D are side views showing various suitable conformation roll surfaces for forming fastener elements of the invention.
Figure 8A:
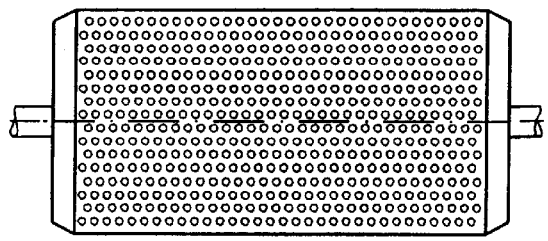
Figure 8B:
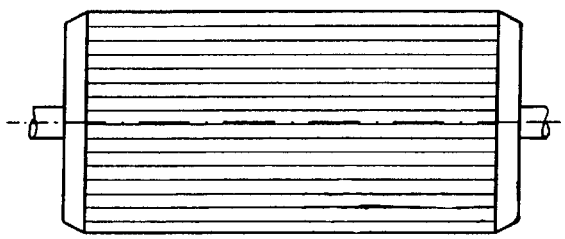
Figure 8C:
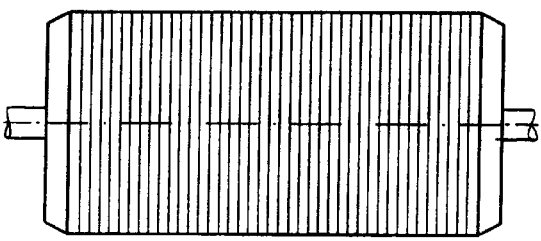
Figure 8D:
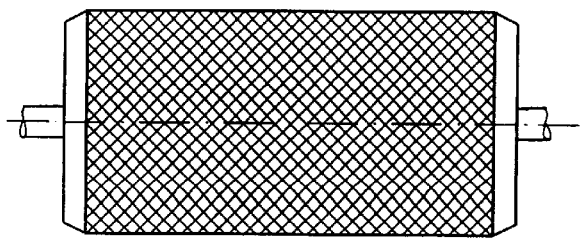

The surface texture of conformation roll 114 will determine the shape of the heads that are formed. If disc-shaped heads having a smooth surface are desired, the surface texture will be smooth and flat. If a sandpaper-like surface is desired, the surface texture of the conformation roll will be sandpaper-like (FIG. 8). If mushroom-shaped (domed) heads are desired, the conformation roll will include a plurality of substantially hemispherical indentations ("dimples") to form the dome portion of the heads (FIG. 8A). Disc-shaped heads having a "wavy" shape, e.g., as shown in FIGS. 3 and 3A, can be formed using the conformation roll surfaces shown in FIGS. 8B and 8C. The diamond-lattice conformation roll surface shown in FIG. 8D will give the head a pyramidal shape, e.g., as shown in FIG. 3C. The conformation roll may also have a soft surface (not shown), e.g., rubber, to provide a mushroom-shaped head.

Preferably, when the surface texture includes dimples, the density of the dimples is substantially uniform over the roll surface, and is greater than or equal to the density of stems on the base 12. To allow for improper registration between the stems and the dimples, it is preferred that the density of the dimples be substantially greater than the density of the stems (if the density is equal, improper registration may result in none of the stems being contacted by dimples).

As discussed above, while the uniformly overhanging, domed head shape shown in FIG. 2 is generally preferred, obtaining this shape may unduly complicate manufacturing, due to the need to maintain substantially complete registration between the dimples and stems. As a result, for ease of manufacturing it may in some cases be desirable to form less uniform head shapes by allowing the dimples and stems to be in partial registration, rather than full registration. In these cases, the conformation roll should have a density of dimples that is significantly higher than the density of stems, to increase the probability of contact between the dimples and stems. In this manner, some of the heads are likely to have the shape shown in FIG. 2, while other heads will have different head shapes resulting from contact of a stem with a portion of a dimple.

The spacing of the conformation roll 114 from the drive roll 116 is selected to deform portion P of the stems to form the desired head shape, without excessive damage to the unheated portion of the stems. It is also preferred that the spacing be sufficiently small so that the drive roll flattens base 12 and provides substantially uniform contact pressure of stem tips 109 against the conformation roll. Preferably, the spacing is approximately equal to the total height of the stem (L1, FIG. 7A) less the length of the heated portion P (L, FIG. 7A).

Next, the base 12 moves to a cooling station 118. Cooling station 118 cools the formed heads, e.g., by cool air, preventing further deformation of the heads. Preferably, the heads are cooled to approximately room temperature. The cooled base is then moved through driving station 120 and wound onto take-up roll 122 by winding element 124.

Alternate supply and take-up rolls 126, 128 are provided so that when supply roll 102 is depleted and/or when take-up roll 124 is filled, the appropriate roll can be easily replaced without disrupting the process.

Suitable materials for use in forming the fastener are thermoplastic polymers that provide the mechanical properties that are desired for a particularly application. Preferred polymers include polypropylenes, such as those available from Montell under the tradename MOPLEN, polyethylenes, ABS, polyamides, and polyesters (e.g., PET).

Other embodiments are within the claims.

For example, while disc-shaped heads have been shown and discussed above, the head may have any desired shape that provides a surface overhanging the base to an extent sufficient to provide a multi-directional engagement having desired strength characteristics.

Moreover, while the process described includes only a single heating of the stem tips and a single pass through a conformation head, these steps may be repeated one or more times to provide other head shapes. Subsequent conformation heads may have the same surface as the first conformation head, or may have different surfaces.

In addition, if desired the stem tips may be cooled after the heating step and immediately before the conformation head, to form a spherical head that is then forced down against the stem, embedding the upper portion of the stem in the head to form a mushroom-shaped head.

Further, in some cases it is not necessary to cool the conformation roll. If the desired head shape can be obtained and resin sticking can be avoided, the conformation roll may be used without either heating or cooling, or may be heated.

What is claimed is:

1. An attachment strip for attaching a mesh screen to a surface, comprising:
   (a) a substantially planar base;
   (b) a plurality of elongated stems extending from said base; and
   (c) a plurality of heads, each head being disposed at a terminal end of one of said stems, at least a portion of said heads having a rough surface having a sandpaper-like surface texture
   wherein the sandpaper-like surface has sufficient surface roughness to increase the peel strength of fastener by from about 10 to 100%, relative to the peel strength of a similar fastener element having a head to which no surface roughness has been imparted.

2. The attachment strip of claim 1 wherein the sandpaper-like surface has a surface roughness of from about 10 to 200 microns.

3. The attachment strip of claim 1 wherein said heads are substantially mushroom shaped.

4. The attachment strip of claim 1 wherein said heads are substantially disc-shaped.

5. The attachment strip of claim 1 wherein said heads are of a shape selected from the group consisting of wavy and pyramidal-shaped.

6. The attachment strip of claim 1 wherein the heads include a domed portion.

7. A fastener element comprising:
   an elongated stem extending from and molded integrally with a substantially planar based; and
   a head disposed at a terminal end of the stem, at least a portion of said head having a rough surface with a sandpaper-like surface texture;
   wherein said rough surface has sufficient surface roughness to increase the peel strength of the fastener by from about 10 to 100%, relative to the peel strength of a similar fastener having heads to which no surface roughness has been imparted.

8. The fastener element of claim 7 wherein the sandpaper-like surface has a surface roughness of from about 10 to 200 microns.

9. The fastener element of claim 7 wherein said head is substantially mushroom shaped.

10. The fastener element of claim 7 wherein said head is substantially disc-shaped.

11. The fastener element of claim 7 wherein said head is of a shape selected from the group consisting of wavy and pyramidal-shaped.

12. The fastener element of claim 7 wherein the head includes a domed portion.

* * * * *

UNITED STATES PATENT AND TRADEMARK OFFICE
CERTIFICATE OF CORRECTION

PATENT NO.   : 6,708,378 B2
DATED        : March 23, 2004
INVENTOR(S)  : Juan Sanchez and Luis Parellada Armela It is certified that error appears in the above-identified patent and that said Letters Patent is hereby corrected as shown below:

Column 8,
Line 34, replace "based" with -- base --.

Signed and Sealed this

Fifteenth Day of February, 2005

JON W. DUDAS
*Director of the United States Patent and Trademark Office*